US006163699A

United States Patent [19]
Naor et al.

[11] Patent Number: 6,163,699
[45] Date of Patent: Dec. 19, 2000

[54] ADAPTIVE THRESHOLD SCHEME FOR TRACKING AND PAGING MOBILE USERS

[75] Inventors: Zohar Naor; Hanoch Levy, both of Tel Aviv, Israel

[73] Assignee: Ramot University Authority for Applied Research and Industrial Development Ltd., Tel Aviv, Israel

[21] Appl. No.: 08/929,100

[22] Filed: Sep. 15, 1997

[51] Int. Cl.[7] ................................................. H04Q 7/00

[52] U.S. Cl. .................... 455/453; 455/405; 455/516; 370/329

[58] Field of Search .................. 455/426, 432, 455/456, 457, 458, 435, 443, 444, 440, 509; 340/825.44; 379/113, 458, 426, 525, 526, 435; 370/332, 326, 338, 465, 522

[56] References Cited

U.S. PATENT DOCUMENTS

| | | |
|---|---|---|
| 5,212,822 | 5/1993 | Fukumine et al. . |
| 5,400,392 | 3/1995 | Nagashima et al. ..................... 455/456 |
| 5,511,214 | 4/1996 | Yamada .................................... 709/103 |
| 5,634,006 | 5/1997 | Baugher et al. .................... 395/200.06 |
| 5,642,398 | 6/1997 | Tiedemann, Jr. et al. .............. 455/426 |
| 5,649,286 | 7/1997 | Frerking .................................. 455/435 |
| 5,666,652 | 9/1997 | Lin et al. ................................. 455/435 |
| 5,710,972 | 1/1998 | Lin .......................................... 455/525 |
| 5,732,350 | 3/1998 | Marko et al. ........................... 455/435 |
| 5,740,533 | 4/1998 | Lin .......................................... 455/432 |
| 5,832,381 | 11/1998 | Kauppi .................................... 455/432 |
| 5,875,400 | 2/1999 | Madhavapeddy et al. ............. 455/458 |
| 5,912,918 | 6/1999 | Bauchot et al. ........................ 375/133 |
| 6,031,864 | 2/2000 | Bauchot et al. ........................ 375/202 |

OTHER PUBLICATIONS

Tabbane, S., "An Alternative Strategy for Location Tracking", *IEEEJSAC*, 13(5): 880–892 (1995).

Madhow, et al, "Optimization of Wireless Resources for Personal Communications Mobile Tracking", *IEEE Trans. On Networking*, 3(6): 698–707 (1995).

Ho et al, "Mobile User Location Update and Paging Under Delay Constraints", *Wireless Networks*, 1: 413–425 (1995).

Rose, C., "Minimizing the Average Cost of Paging and Registration: A Timer–Based Method", *ACM J. Of Wireless Networkd*, 2(2):109–116 (1996).

Bar–Noy et al, "Mobile Users: To Update or Not to Update?", *Wireless Networkd*, 1(2): 175–85 (1995).

Rose et al, "Minimizing the Average Cost of Paging Under Delay Constraints", *ACM J. Of Wireless Networkd*,1(2): 211–219 (1995).

Bar–Noy et al, "Tracking Mobile Users in Wireless Communications Networks", *IEEE Trans. On Information Theory*, 39: 1877–1886 (1993).

*Primary Examiner*—Dwayne D. Bost
*Assistant Examiner*—Charles Craver
*Attorney, Agent, or Firm*—Mark M. Friedman

[57] ABSTRACT

A method of allocating access to a shared media network, with specific application to tracking and paging mobile users of a cellular telephone network. Each cell of the network broadcasts a load factor $\alpha$, representative of the load on the cell's control channel. Each user in a cell determines a registration priority for itself, and also a registration threshold based on $\alpha$. In the preferred embodiment of the present invention, each user is assigned a base threshold time T, and each user in a cell computes a registration threshold time T', based on T and $\alpha$, and registers its location with the network if the last such registration was longer ago than T'. Users are paged only in cells to which they could have traveled since their most recent location updates.

25 Claims, 3 Drawing Sheets

ADAPTIVE THRESHOLD SCHEME FOR TRACKING AND PAGING MOBILE USERS

FIELD AND BACKGROUND OF THE INVENTION

The present invention relates to shared media networks, such as cellular telephone networks, and, more particularly, to a method for tracking and paging users of such networks.

The growing demand for Personal Communication Services (PCS) increases the need for efficient utilization of the limited radio resources available for wireless communication. The present invention is concerned with the utilization of the wireless resources devoted to location management. The problem addressed by the present invention is the minimization of the wireless cost of mobile user tracking in PCS networks.

The utilization of wireless network resources for mobile user tracking has been addressed by many studies. Basically, there are two extreme strategies that may be used for user tracking. In the first strategy, known as "Never Update", the user never updates its location. Thus, whenever there is a need to set up an incoming call directed to the user, the system must search for him/her all over the network. In the other extreme strategy, known as "Always Update", the network continuously keeps track of the user location. Various strategies which combine these two extremes have been proposed in the literature. Examples of these strategies include C. Rose and R. Yates, "Minimizing the Average Cost of Paging Under Delay Constraints", ACM Journal of Wireless Networks, Vol. 1, No. 2, pp. 211–219, 1995; A. Bar-Noy and I. Kessler, "Tracking Mobile Users in Wireless Networks", IEEE Trans. on Information Theory, Vol. 39, pp. 1877–1886, November 1993; A. Bar-Noy, I. Kessler and M. Sidi, "Mobile Users: To Update Or Not to Update?". Wireless Networks, Vol. 1, No. 2, pp. 175–185, 1995; C. Rose, "Minimizing the Average Cost of Paging and Registration: A Timer-Based Method", ACM Journal of Wireless Networks, Vol. 2, No. 2, pp. 109–116, 1996; J. Ho and I. F. Akyildiz, "Mobile User Location Update and Paging Under Delay Constraints", Wireless Networks, Vol. 1, pp. 413–425, 1995; U. Madhow, L. Honig, and K. Steiglitz, "Optimization of Wireless Resources for Personal Communications Mobility Tracking" IEEE Trans. on Networking, Vol. 3, No. 6, pp. 698–707, 1995; and S. Tabbane, "An Alternative Strategy for Location Tracking", IEEE JSAC, Vol. 13, No. 5, pp. 880–892, 1995.

The basic idea shared by these papers is known as the "Partial registration" strategy. Namely, upon location change a user may or may not update its new location. The criterion for user registration may be static, such as network partition into location areas. For example, in the GSM system the network is partitioned into groups of cells, referred to as location areas. A user updates its location each time it changes a location area, while within a location area it uses the "Never Update" strategy. Because the partition into location areas is static, and done by the system, not accounting for the user dynamic behavior, this strategy is termed "static". Another type of partial registration strategy is the dynamic strategy, in which each user decides when and where to update its location. The criterion for user registration may be a function of time (Rose, 1996), distance from last known location (Bar-Noy et al. 1995; Madhow et al., 1995), number of movements between cells (Bar-Noy et al., 1995), or based on personal location profile (Tabbane, 1995). All the dynamic partial registration strategies mentioned above are implemented solely on user equipment. As such, they ignore the system activity, and depend solely on the user activity.

The optimal solution which minimizes the user tacking cost using these methods is of high computational complexity, and often requires a dynamic programming method. Some of these strategies (such as the distance based strategy) require information that is not generally available to the user. Thus, an implementation of an optimal solution on the user equipment is not feasible, due to commercial, maintenance and reliability reasons. In practice, users may register using a fixed, pre-defined parameter (timer, distance, etc.), regardless of the exact details of user activity. Clearly, the performance of such an implementation is inferior to the optimal strategy. In addition, because the user decision whether to register (update) or not to register ignores the status of other users in the network, as well as the total load on the network, the likelihood of collision is expected to be very high, especially at high load periods.

There is thus a widely recognized need for, and it would be highly advantageous to have, a method of mobile user tracking in PCS networks that would overcome the disadvantages of presently known methods as described above.

SUMMARY OF THE INVENTION

According to the present invention there is provided, in a shared media network including a plurality of users, a method for allocating network resources among the users, including the steps of: (a) computing at least one load factor $\alpha$; (b) transmitting, to each user, one of the at least one $\alpha$; (c) for each user, computing an access threshold, based on the $\alpha$ transmitted to the each user; (d) for each user, computing an access priority; and (e) for each user, accessing the network at a time depending on the access threshold and the access priority.

According to the present invention there is provided, in a shared media network including a plurality of users moving among a plurality of cells defined by boundaries, a method for tracking the users, including the steps of: (a) for each cell: (i) computing a load factor $\alpha$, and (ii) transmitting $\alpha$ to each user located in the each cell; (b) for each user, computing a registration threshold, based on $\alpha$; (c) for each user, computing a registration priority; and (d) for each user, registering, with the network, an identity of a cell whereat the each user is located, at a time depending on the registration threshold and the registration priority, the registering thereby constituting a location update for the each user.

According to the present invention there is provided, in a shared media network including a plurality of users moving among a plurality of cells, a method for paging the users, including the steps of: (a) for each cell, providing a load factor $\alpha$; and (b) for each user: (i) determining a personal location area, based on $\alpha$, and (ii) paging the each user only in cells located in the personal location area.

Recognizing the drawbacks of the prior art methods, the present invention shifts a significant part of the tracking activity from the user's equipment to the system's equipment, and integrates more intelligence on the network side. The basic idea is to leave user specific decisions in the user's equipment while moving network general decisions to the network. Guided by this basic idea, the present invention uses a novel approach for mobile user tracking, in which the registration of a user is based not only on its own activity, but also on local network load and the status of other users within the same cell.

The implementation of this approach is achieved via the following mechanism: A user computes its registration priority based on its own activity. On the other hand the network determines, for each cell, a load factor, based on cell load, time of day, day of week, etc. This parameter, which is unique for each cell, is transmitted by each base station, as a broadcast message to all the users within the cell, through the down link control channel. Finally, the decision of when to transmit a registration message is done by the user but is based on both parameters: Such a message is sent whenever the user's registration priority exceeds a local registration threshold level based on the cell's load factor.

The advantage of the present invention over other methods is in taking into account the system activity: Less critical registration messages are avoided during heavy traffic periods, while low traffic periods and areas are used to gather extensive information on user locations. Fukumine et al., in U.S. Pat. No. 5,212,822, present a registration method for a mobile communication system in which, as in the present invention, the users' decisions whether to register are based on information received from the base stations; but that information is static information that relates to the geometry of the system. In the present invention, the information broadcast to the users reflects the dynamic load of each cell.

In its most general form, the adaptive threshold scheme of the present invention is a method for allocating access to shared media networks in general. Examples of shared media network accesses to which this adaptive threshold concept is applicable include accesses of shared data bases, routing in large networks, and access in X-protocol based networks. Load sensitive algorithms, in many areas, are implemented either by a central approach, in which system resources are allocated to the users by the system, or by a distributed approach, in which each user makes its own decisions, using an agreed upon Media Access Control protocol. The adaptive threshold approach of the present invention suggests another way: Due to the huge number of users in a PCS network, the media access algorithm (i.e. the registration) must be distributed, where each user makes its own decision when and where to update its location. On the other hand, to reduce the likelihood of collision, and improve system performance, the network informs the users about the cost of registration.

The present invention has two aspects:

1. An access algorithm, based on a dynamic threshold, which is sensitive both to the user activity and to the system load.
2. In a PCS network, an efficient paging algorithm which takes advantage of the dynamic thresholds used by the access (registration) strategy.

Although the present invention is applicable to shared media networks in general, the focus of the detailed description below is on the specific application of the present invention to tracking and paging users in a PCS network. In the context of a PCS network, the system load is the load on the cells of the system. In the context of shared media networks in general, the correspondences of the components of a specific type of shared media network to the components of a PCS network will be transparent to those ordinarily skilled in the art. For example, in a shared data base, the data base itself can be treated as a single large cell; and in the routing problem, each node of the network corresponds to one cell. Whenever the term "registration" is used herein, it will be transparent to those ordinarily skilled in the art what the corresponding access mode is in any given shared media network.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method for tracking and paging mobile users of a shared media network. Specifically, the present invention can be used to track and page the users of a PCS network.

The principles and operation of user tracking and paging according to the present invention may be better understood with reference to the drawings and the accompanying description.

Consider a wireless network partitioned into cells. The network is assumed to be large enough, so that the expected number of users is constant, and assumed to be mitch larger than the number of radio channels. To a good approximation, the number of users may be considered as infinite, for traffic considerations. The user location is understood as an identifier of a cell in which the user is currently residing. Two cells are called neighboring cells if a user can move from each one of them to the other, without crossing any other cell. To model user movement in the network it is assumed that time is slotted, and that a user can make at most one cell transition during a slot. It is assumed that the movement of the user is done only at the beginning of a time slot, such that the movement precedes any other event, such as a paging event. The movements are assumed to be stochastic and independent from one user to another. It is assumed that calls are initiated by the users as a Poisson process at average rate $\lambda$. The user roaming interval is defined as in Rose (1996), as the time interval since the last contact of a user with the system, and the next paging event to this user.

The tracking algorithm is split between the user and the network. The registration algorithm performed by the user is based on the user activity and on the load factor, computed by the network. Each cell computes its own load factor, independent of the other cells, and announces it to the users as a broadcast message, through the down link control channel. In addition, each user computes its own registration priority. Preferably, the user's registration priority is based on its current foaming interval, defined as the length of time since the last time it contacted the system to notify the system of its location; although the scope of the present invention includes priorities based on other dynamic user parameters, such as the distances traveled by the user since the user's last contact with the system or the number of cell boundary crossings performed by the user since the user's last contact with the system. The user also computes a local registration threshold time, based on the local load factor. Although in general the user registration priority may be any monotonic function of the user's Current roaming interval, in the embodiment of the present invention presented herein the user registration priority is identical to the user's current roaming interval. Whenever the user registration priority exceeds the local registration threshold time, the user transmits a location update message. Because the local load factor depends on the current load on the cell, different cells may have different load factors.

The search algorithm at a paging event is restricted only to the set of all possible user locations. Namely, all the cells that satisfy two conditions: 1) The user's registration threshold time in those cells at the paging event is higher than the user roaming interval, say t, and, 2) The cells are reachable from the user last known location within t steps, without sending a registration message on the way.

The user registration strategy is based on a timer-based approach (Rose, 1996). In the preferred embodiment of the present invention described herein, the user attempts to transmit an update message every T' time units, where the parameter T' is not fixed, but depends on the current signaling load at the user location. The parameter T', referred to as the local registration threshold time, is evaluated by the user using T'=Tα, where T is a fixed, pre-defined base priority time, unique for the user, and α is the local load factor, transmitted by each base station as a broadcast message, through its down link control channel (DCCH, in the GSM system). The dynamic parameter α reflects the current local load on the control channel, thus it may vary from cell to cell. The load factor of a cell i is denoted by α(i). The user will transmit a registration message whenever:

$$t \geq T' = \max\{T\alpha(i), 1\} \quad (1)$$

where time is measured in units of time slots, where t is the user current roaming interval and where i is the user current location.

Each cell in the network computes its current load factor, independently of the other cells. The load factor is transmitted by the cell, as a broadcast message, through the clown link control channel. Because registration messages are transmitted through the up link control channel (UCC), the main concern is to guarantee that an increase in the registration activity will not jam the UCC.

The basic idea is the following: Let $\rho_{ucc}$ be the fraction of the UCC bandwidth used by a cell, $0 \leq \rho_{ucc} \leq 1$. Whenever $\rho_{ucc}$ drops below a pre-defined threshold, say $\rho_L$, the load factor α decreases. As a result, the activity of location update operation (registration) increases on lightly loaded cells. On the other hand, whenever $\rho_{ucc}$ exceeds (another) pre-defined threshold, say $\rho_H(\rho_H > \rho_L)$, the load factor increases. To stabilize the algorithm, the modification rate of the load factor follows a hysteresis curve.

Load Factor Modification Algorithm

Because the UCC is used for call handling requests and registration messages initiated by the users, the actual use of UCC resource, denoted by $U_{ucc}$ is given by:

$$U_{ucc} = U_r + U_c \quad (2)$$

where $U_r$ is the bandwidth actually used for registration, and $U_c$ is the bandwidth used for the call requests initiated by the users. In reality, the registration threshold time T' is significantly smaller than the reciprocal of the call rate: $T' \ll 1/\lambda$. Thus, the registration rate is, for a good approximation, given simply by $1/T'$, implying that it is linear with $1/\alpha$. Therefore, given a UCC utilization $\rho_{ucc}$, the new value of the load factor, denoted by α', required to obtain a desired UCC utilization $\rho_d$, is given by:

$$\frac{\rho_d}{\rho_{ucc}} = \frac{U_r \frac{\alpha}{\alpha'} + U_c}{U_r + U_c} \quad (3)$$

Solving for α' gives:

$$\alpha' = \alpha \left[ \frac{U_r}{\frac{\rho_d}{\rho_{ucc}}(U_r + U_c) - U_c} \right] \quad (4)$$

A reasonable choice of the desired UCC utilization $\rho_d$ is: $\rho_d = (\rho_L + \rho_H)/2$. Thus, the modification rate of the load factor α should be a function of the UCC utilization, $\rho_{ucc}$, the current bandwidth used for registration, $U_r$, and the thresholds $\rho_L$ and $\rho_H$. To ensure the stability of the load factor, the size of the time interval required to evaluate the next value of the load factor should be long enough to avoid statistical fluctuations. Preferably it is significantly longer than the time slot used for registration.

The Paging Algorithm

Consider a paging event at time t=τ. for a user u with roaming interval equal to τ, whose last known location, at time t=0, is $X_0$. The distance between two cells, say x and y, denoted by d(x,y), is defined as the length of the shortest path between x and y, measured in number of cells. Notice that d(x,x)=0, and that d(xy)=1 if and only if x is a nearest neighbor of y.

The goal is to minimize the number of locations at which the user is paged.

Definition: The mobility graph G is defined as a directed graph, in which all vertices are of the form (x,t) where x is a cell in the network, and t is a time slot. Note that x and t are integers. A (directed) edge exists between two vertices, say $(x_1, t_1)$ and $(x_2, t_2)$. in the mobility graph if and only if: 1) $d(x_1, x_2) \leq 1$, and 2) $t_2 = t_1 + 1$. Notice that there are two different types of edges in the mobility graph:

A static edge is a directed edge from the vertex (x,t) to the vertex (x,t+1), reflecting a situation where the user remains at its last location.

A dynamic edge is a directed edge from the vertex $(x_1, t)$ to the vertex $(x_2, t+1)$, where $x_1$ and $x_2$ are nearest neighbors, reflecting a user motion from cell $x_1$ into cell $x_2$, at time t+1.

Definition: A non-reporting (NR) vertex is a vertex (x,t) in the mobility graph satisfying both conditions:

$$\alpha(x,t) > t \quad (5)$$

$$0 \leq t \leq d(X_0, x) \leq \tau \quad (6)$$

A Non-Reporting vertex represents a point (in time and space) which is reachable from the user last known location during its roaming interval, and in which the user should not transmit a registration message.

Note that because distance is measured in number of cells, and time is measured in time slots, distance is commensurate with time, using the assumption that a user can make at most one cell transition during a single time slot. This assumption can become reality by properly choosing the size of the time slot, such that a user can not cross more than one cell during a single time slot. For example, a user moving at a velocity of 6 km/h can move at most 100 meter in one minute.

Note that $(X_0, 0)$ is always a NR vertex, because α(x,t) T>0; for all x and t, and d(x,x)=0 for all x.

A feasible roaming path is defined as a directed path in the mobility graph, which starts at $(X_0,0)$, and for which all the vertices in the path are NR vertices. Given that the roaming interval of u is equal to $\tau$, its actual roaming path must be a flesible roaming path in length $\tau$, starting at $(X_0,0)$ and terminating at the user location at time $\tau$.

Definition: The personal location area (PLA) of u at time $\tau$, is defined as the set of all cells, x, such that the vertex $(x,\tau)$ in the mobility graph is a non-reporting vertex, and is connected to the vertex $(X_0,0)$ through a roaming path.

Lemma 1: Let x be the location of a user u at time $t=\tau$. Then, x is a member of the PLA of u.

The proof is given in appendix A.

Lemma 2: The PLA of u is the minimal set of cells, satisfying the condition that paging u in all cells within the set must locate u.

The proof is given in appendix B.

The meaning of Lemmas 1 and 2 is that the PLA of u is the minimal set of locations at which paging u guarantees a success.

The paging algorithm is subject to one-phase paging delay: When a paging event occurs, the user is paged simultaneously in all the cells belonging to the PLA.

The first step of the paging algorithm is to find all cells belonging to the PLA of u. The algorithm uses a Breadth First Search (BFS) on the mobility graph, beginning from the vertex $(X_0,0)$, which represents the user last known location, $X_0$, at time $t=0$. The BFS is conducted in steps, where the k-th step accepts as an input a set, $A(k-1)$, produced by the $(k-1)$ step, and generates the set $A(k)$. $A(k)$ is the set of NR vertices of the form $(x,k)$, connected to the vertex $(X_0,0)$ through a feasible roaming path. For each member in $A(k-1)$, say $(x,k-1)$, in the k-th step all vertices of the form $(x',k)$ are considered, where x' is either x or a nearest neighbor of x. If $(x',k)$ is a NR vertex, it is added to the set $A(k)$. In the first step $A(0)$ contains the vertex $(X_0,0)$, and the nearest neighbors of $X_0$ are considered at time slot $t=1$. The search is terminated when either $k=\tau+1$, or the set $A(k)$ is empty.

Proposition: The set of all cells x, such that $(x,\tau) \in A(\tau)$ is the PLA of u. Namely, $A(\tau)$ contains all NR vertices of the form $(x,\tau)$, connected to $(X_0,0)$ through a feasible roaming path.

The proposition can be proved by induction on k that shows that $A(k)$ is the set of all NR vertices of the form $(x,k)$, connected to $(X_0,0)$ through a feasible roaming path in length k. Thus, $A(\tau)$ is the set of all NR vertices of the form $(x,\tau)$, connected to $(X_0,0)$ through a feasible roaming path.

To construct the PLA of u the system keeps, for each cell, a table of its load factor $\alpha$, as a function of time. In addition, the mobility graph is based on the adjacency graph of the network.

Because the BFS is conducted on both time and space, the nearest neighbors of $X_0$ can be visited in the worst case $\tau$ times, while the cells in a distance $\tau$ from $X_0$ are visited at most one time. Recalling that a user can make at most one cell transition during a time slot, distance is commensurate with time. Let $n(X_0,j)$ be the number of cells within a distance less or equal to j from $X_0$, where $n(X_0,0)=1$. In the i-th iteration of the BFS algorithm, at most $n(X_0,i)$ vertices are considered. An upper bound on the worst case complexity of the BFS algorithm is given by:

$$S(X_0, \tau) = \sum_{i=0}^{\tau} n(X_0, i).$$

In reality, the number of nearest neighbors of a cell is bounded by some constant, and so is the density of cells per area unit. Thus, the maximal number of cells reachable within t time-slots is $O(t^2)$, and the worst case complexity of the BFS algorithm is therefore:

$$S(X_0, \tau) = \sum_{i=0}^{\tau} O(i^2) = O(\tau^3).$$

The explanation of the computational complexity is that the BFS on the mobility graph searches in $O(\tau^2)$ cells, each cell has at most $\tau$ vertices, yielding $O(\tau^3)$ vertices, and therefore $O(\tau^3)$ edges.

Lemma 3: If the number of cells reachable within t time slots is $\Omega(t^2)$, then the construction of the PLA has a worst case complexity of $\Omega(t^3)$.

The proof is given in appendix C.

Note that the process which finds all members of the PLA is a computational task. As such, it makes no use of wireless network resources. The search is done on the mobility graph, not on the network's physical infrastructure.

In practice, the load distribution over the network changes gradually, relative to user motion. Thus, the load factor is expected to change only every k time slots, where k is a constant. The number of iterations required can be reduced to $x=[\tau/k]+1$, where in each iteration the BFS is extended by a distance k. The worst case complexity, under this assumption becomes: $S=O(k^2x^3)$, which is proportional to $\tau^3/k$. This is still $O(\tau^3)$, but the computational task is reduced by a factor k. Consider for example a user with average velocity of 6 km/h within a two-dimensional mesh topology of cells in dimensions of 100 m×100 m for each cell. A proper choice of a time slot is 1 minute, while the update rate of the load factor may be every 10 minutes, yielding k=10.

In practice, the local load in each cell is not expected to vary significantly during a single roaming interval. For example, if the maximal registration threshold time for any user is approximately 15 minutes and the load factors are updated every 10 minutes, then for most cells the local registration threshold time is not expected to change during the user's roaming interval. Thus, the registration threshold time is expected to change very slowly within the user roaming interval. Assuming: $\alpha(x,0) \approx \alpha(x,\tau)$. $\forall x$ there is no need for $\tau$ iterations. Under this assumption, the BFS can be conducted only on vertices of the form $(x,\tau)$ in one iteration.

Consider a user u whose last known location is $X_0$, at time 0. If a paging event occurs at time $\tau$, then a search is conducted simultaneously in all the members of $A(\tau)$. Because the search is conducted in one phase, the paging delay is minimal. On the other hand, the cost of paging, in terms of number of locations that must be searched is relatively high.

Performance Analysis

In general, a dynamic registration threshold time parameter is more efficient than a static one, for the following reasoning: Let $T_s$ be a static registration threshold time. The dynamic parameter T' in location i at time t is given simply by: $T'=T_s\alpha(i,t)$. Whenever $T'<T_s$, it implies that there are non-utilized wireless resources in the UCC of cell i, at time t, to be used by the system to reduce the expected paging cost, without inflicting any degradation on system performance. In other words: without increasing the actual cost of registration. On the other hand, a situation where $T'>T_s$ implies that the UCC is overloaded. In practice, such cells are split to prevent undesirable grade of service. Therefore this situation is expected to exist only for short time periods, in a small fraction of the network. Minimizing the registration activity during these epochs should guarantee the quality of service provided by the network, without increasing significantly the uncertainty in user location.

The question which remains open is the quantification of the differences in the tracking cost between static and dynamic registration threshold time parameters. In general, the efficiency of the ATS method, relative to other dynamic strategies, depends on the exact details of the network topology, the load distribution on the network, and the users mobility and call pattern. Moreover, because the load factor may vary from one cell to another, and depends on both location and time, the cost of paging a user depends also on its traveling path.

Let $F(x,t)$ be the expected cost of paging a user at time t, given that its last known location is x, at time 0. Implicit in the (x,t) notation is the assumption that the distribution of user location at time $t>0$ depends only on its location at $t=0$. For the sake of simplicity this notation is retained herein, with the understanding that it may be extended in the future. The expected cost of paging a user whose last known location is x is then given by:

$$F(x) = \sum_t F(x,t) P(t) \quad (7)$$

where $P(t)$ is the probability that the user roaming interval is terminated by a paging event at time t. The expected cost of paging the user is then:

$$C = \sum_x \eta(x) F(x) \quad (8)$$

where $\eta(x)$ is the probability that the user last known location is x. It should be noted that $\eta(x)$ is not necessarily the steady state probability of being in location x. The reason is the dependency of $\eta(x)$ on the registration process, which is itself dependent on user location. For example, crossing a lightly loaded cell, even for a short period of time, will produce a registration message, while residing within a highly loaded cell will cause registration only if the user roaming interval exceeds the local registration threshold time, which is expected to be relatively high.

In order to relate the performance of the ATS strategy to the steady state location probability distribution, the concept of the potential uncertainty in location, induced by the ATS strategy on the network, is used. This location uncertainty provides an upper bound on the paging cost. Let $\phi(x,\tau)$ be the number of cells belonging to the PLA of a user whose location at time 0 is x, at time $\tau$, given that no location update occurred in $[0,\tau]$. The potential uncertainty of u is defined as:

$$\Delta(x) = \sum_\tau \phi(x,\tau) \theta(x,\tau) \quad (9)$$

where $\theta(x,\tau)$ is the probability that the roaming interval is in length $\tau$, given that the location is x. An upper bound on the paging cost is given by:

$$\sum_x q(x) \Delta(x) \quad (10)$$

where $q(x)$ is the probability that the user location at time 0 is x. Because user motion and paging are assumed independent processes, $q(x)$ is equal to $\pi_x$, the steady state probability of being in location x.

Equation (10) provides the expected cost of one-phase paging under the ATS strategy, because all the cells in the PLA are paged simultaneously. The static registration threshold time method can be derived as a special case of the ATS strategy, for homogeneous load distribution. In this situation, $\phi(x,\tau)$ is simply all cells in a distance not larger than $\tau$ cells from the user last known location, and all local registration threshold times have the same value, say T. Because in reality the load distribution is never homogeneous, the value of T must be derived from the load on the most loaded cells. The paging cost under the static registration threshold time method can be derived from Equation (10) by substituting $\Delta(x)$ by a constant T'. Following the reasoning stated above, the static registration threshold time T is always greater or equal than a dynamic registration threshold time, thus, the paging cost of the static registration threshold time method is always greater than the paging cost of the AFS strategy. In the extreme case of homogeneous load distribution the ATS strategy yields the same performance as the static registration threshold time method. The other extreme situation is when most of the users concentrate in relatively small number of cells, such that all loaded areas in the network are isolated cells, surrounded by lightly loaded cells, where any transition from one loaded cell to another must cross a series of lightly loaded cells. In this case, the PLA of all users is minimal, even if they transmit registration messages very rarely.

Figure 1:
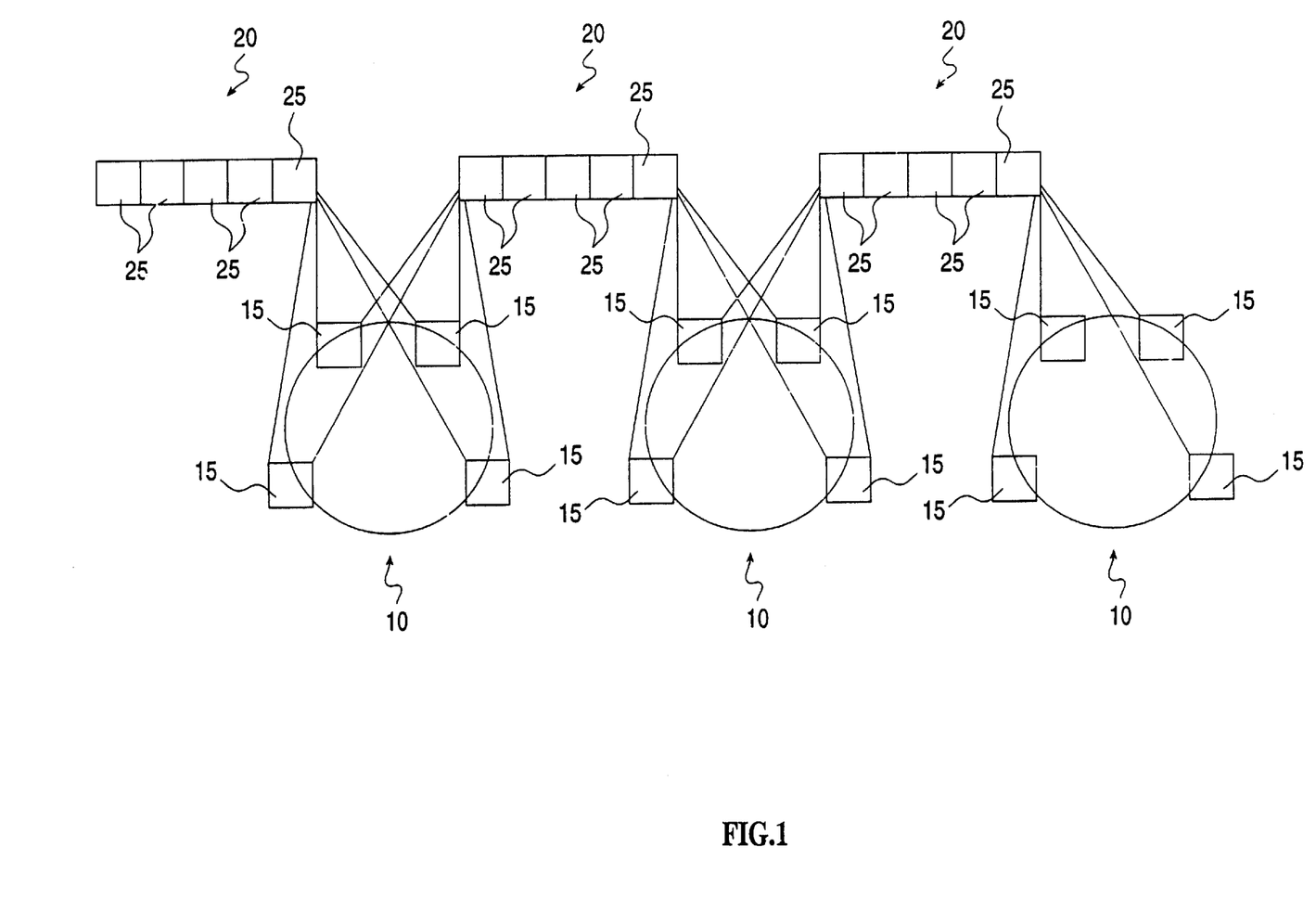
FIG. 1 shows the topology of a model system for analyzing the present invention.

To demonstrate the ATS performance, a system consisting of an infinite chain of highly loaded (HL) areas, connected together through lightly loaded cells, is considered. Neighboring HL areas are separated by a line of D lightly loaded cells. FIG. 1 shows an example of the model, for D=5. The user motion model is a random walk. To model the user movement it is assumed that time is slotted, and a user can make at most one move during a slot. The users movements are assumed to be stochastic and independent from one user to another.

An application that can be modeled by such a system is a group of highly loaded areas such as shopping centers, campuses, or buildings, connected through a highway, or a main road. Each two neighboring HL areas 10 are connected together through a one-dimensional line 20 of D lightly loaded cells 25, where the local registration threshold time in each lightly loaded cell 25 is $T_L$. Within HL area 10, the user motion model is a random walk: A user located in each cell 15 of HL area 10 can move out of HL area 10 or remain in HL area 10. Upon entering a lightly loaded cell 25, the user motion model is also a random walk.

Let T be the local registration threshold time under the static method. Under the ATS strategy there are two local registration threshold times in the system: a relatively long registration threshold time $T_H$ in HL areas 10, and a relatively short registration threshold time $T_L$ in lightly loaded areas 20. Following the reasoning stated above, choose $T_H=T>T_L$. The main advantage of the ATS strategy over the static method lies in the ability of the ATS to increase the registration rate in lightly loaded areas 20. For example, if any attempt to move from one HL area 10 to another must yield a registration message (somewhere along the transition line), then given that the user last known location is inside an HL area 10, its PLA contains no more than one HL area 10. In contrast, using a static method, a search must be conducted, in general, in more than one HL area 10. This model captures the main advantage of the ATS strategy over a static method: if a transition from one highly loaded area to another must cross a lightly loaded cell, a registration message must be transmitted. This update message significantly reduces the future paging cost, without increasing the actual wireless cost of registration.

Clearly, the ATS strategy outperforms the static method within lightly loaded areas 20. However, the problem of reducing the trackings cost is crucial only in HL areas 10. Therefore, the present analysis will concentrate only in evaluating the cost of tracking in those areas. This value is referred to herein as the actual tracking Cost. The registration cost in these cells is identical in both methods, because they both use the same registration threshold time T.

The paging cost is bounded by the number of cells within the personal location area (PLA) of the user. What is of interest is the number of cells within the PLA. Define the threshold distance, denoted by $D^*$, as the maximal number of cells a user can travel within a lightly loaded area without transmitting a registration message. Recalling that a user can make at most one cell transition in a single time slot, it follows that under the ATS strategy $D_{ATS}^*=T_L-1$, while under the static method $D^*_{static}=T-1$. Let $|PLA(\tau)|$ be the size of the PLA of a user having a roaming interval equal to $\tau$, measured in number of HL areas within the PLA. Recall that D is the distance between neighboring HL areas, expressed in terms of number of cells. Then:

Proposition: Under the ATS strategy, an upper bound on the size of the PLA, for any given value of $\tau$, is given by:

$$|PLA(\tau)| \leq \left\lfloor \frac{2D^*+2}{D+1} \right\rfloor + 1 = \left\lfloor \frac{2T_L}{D+1} \right\rfloor + 1 \quad (11)$$

Proof: Let x be the user last known location. The user can enter an HL area without transmitting a registration message only if its distance from x is at most $D^*+1$, in each direction. Thus, the upper bound on the PLA size is the maximal number of HL areas within an interval in a length of $[2(D^*+1)]$, which is $$\left\lfloor \frac{2D^*+2}{D+1} \right\rfloor + 1.$$

Thus, the uncertainty in user location, and therefore the paging cost increases with $D^*/D$: The lower the load on the neighbors of the highly loaded cells, or the larger the distance between two HL cells, the lower the paging cost, as expected. Therefore, the isolation factor of the loaded areas is defined herein as the ratio $D^*/D$.

Note that for $T_L=1$, $D^*=0$, yielding an infinite isolation factor. In this situation, the user location within the lightly loaded area is known precisely.

Using the static method, the PLA size, $|PLA|$, measured in the number of HL areas, is obtained by substituting $D^*_{static}=T-1$ in Equation (11):

$$|PLA(\tau)| = \left\lfloor \frac{2T}{D+1} \right\rfloor + 1 \quad (12)$$

for any given value of $\tau$.

The performance of the ATS strategy now will be compared to the static method, using the above worst-case scenario. Subtracting Equation 11 from Equation 12 demonstrates that the upper bound on the size of the PLA under the static method is greater than the upper bound on the size of the PLA under the ATS strategy by $$\left\lfloor \frac{2(T-T_L)}{D+1} \right\rfloor HL$$

areas. Thus, the ATS strategy outperforms the static method, and the difference in the performance is, to a good approximation, proportional to the ratio $$\frac{2(T-T_L)}{D+1}.$$

This difference increases with $T-T_L$, which reflects the load variability between highly and lightly loaded cells, and decreases with the distance D. If $D \geq 2T$ then $|PLA| \leq 1$ for both strategies, implying that if the distance between neighboring HL areas is large enough, a dynamic threshold time would reduce the paging cost only in the lightly loaded areas. The dependence of the benefit of the ATS strategy on $T-T_L$ implies that even a relatively small reduction in the local registration threshold in the lightly loaded cells, relative to the local registration threshold in the heavily loaded cells, may reduce significantly the paging cost. Consider, for example, a system in which $T=20$, $T_L=16$, and $D=2$. Under the static method the PLA may contain, in the worst case, up to 14 HL areas, compared to at most 11 HL areas under the ATS strategy. Recalling that under the static method most of UCC resources are under-utilized (for most locations), the saving in paging cost is expected to be significant.

Figure 2:
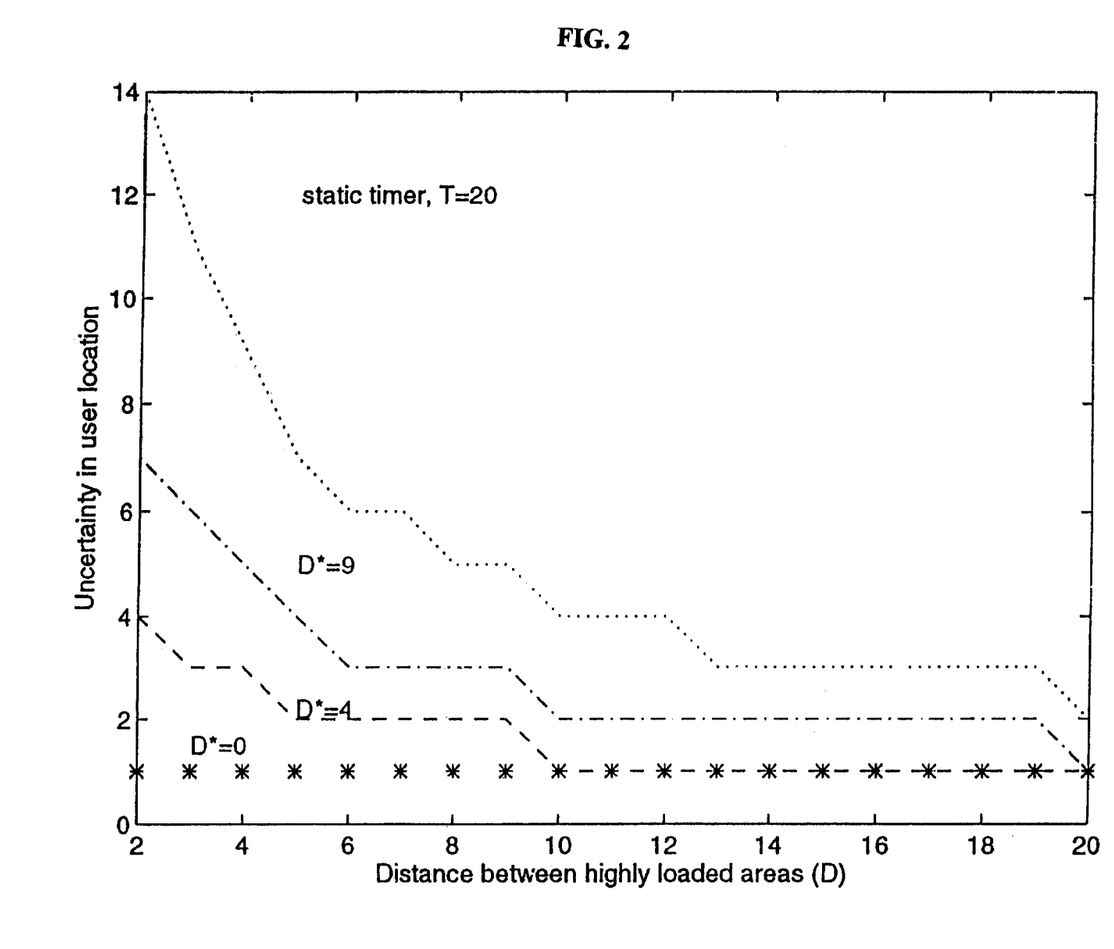
FIG. 2 contains plots of the uncertainty of user location vs. distance between highly loaded areas.
Figure 3:
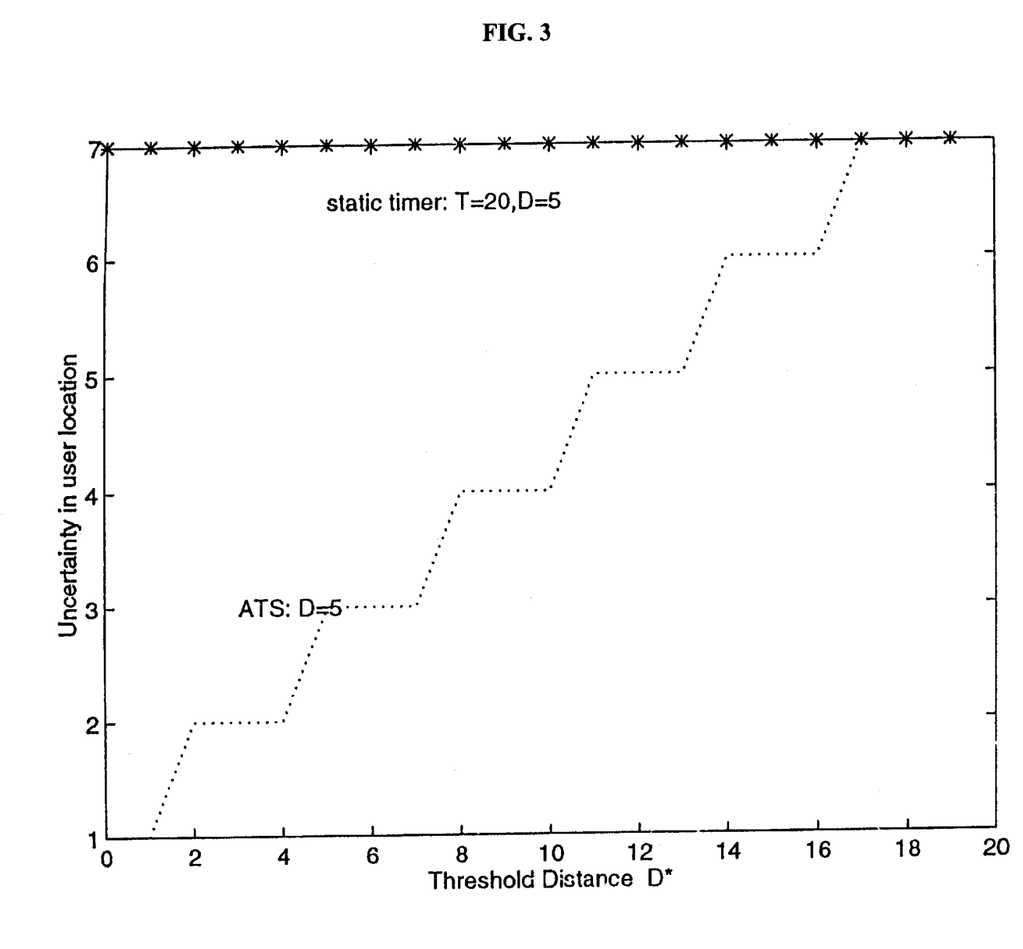
FIG. 3 contains plots of the uncertainty of user location vs. threshold distance.

The performance of the ATS strategy is illustrated in FIGS. 2 and 3.

FIG. 2 depicts the upper bound on the number of rings contained by the PLA, given in Equation 11 for the ATS strategy, and in Equation 12 for the static method, as a function of the distance D between two highly loaded areas. The ATS strategy outperforms the static method, and the difference in the performance of both methods decreases with the distance D, as expected. FIG. 3 demonstrates the dependence of the upper bound on the PLA size, on the threshold distance $D^*_{ATS}$. In the system illustrated, $D=1$ and $T=20$. The ATS strategy outperforms the static method, where optimal performance is achieved for minimal $T_L$, as expected. Both Figures depicts the dependency of the superiority of the ATS strategy on the static method as a function of the ratio $$\frac{(D^*_{static}-D^*_{ATS})}{D}.$$

Appendix A: Proof of Lemma 1

Let x be the location of u at time $\tau$. Because u did not register at $\tau$, $\alpha(x,\tau)>\tau/T$. Thus, $(x,\tau)$ is a NR vertex. Because u did not register during the time interval $[0,\tau]$, its traveling path from $X_0$ to x must form a feasible roaming path. Thus, x is a member of the PLA of u.

Appendix B: Proof of Lemma 2

Let x be a member in the PLA of u. From the definition of the PLA, there is a feasible roaming path from $(X_0,0)$ to $(x,\tau)$. Because the user can move from each cell to each one of its nearest neighbors, there is a sequence of time intervals, say $[0,t_0], [t_0+1,t_1], \ldots [t_1+1,\tau]$, in which lit could pass from $X_0$ to x without transmitting a registration message. Thus, the probability that the location of u at time $\tau$ is x, is greater than 0. Therefore, u must be paged in x.

Appendix C: Proof of Lemma 3

Consider a two-dimensional grid system, where the user's local registration threshold time in each cell changes randomly every time slot, such that the local registration threshold time can take any integer value in the interval $[1,\tau]$, with equal probability for each value. In every time slot, the user can move, with equal probability, to each one of its 8 nearest neighbors. Thus, the number of cells reachable within $\tau$ time slots is $\Omega(\tau^2)$, meaning that after $\tau$ steps there are $\Omega(\tau^2)$ candidates for the user location at time $\tau$. A cell x is a member in the PLA if and only if there exists at least one feasible roaming interval in length $\tau$, describing the user locations at time $t=0,1,2,\ldots\tau$. Thus, given a cell x, the verification that $x \in PLA$ has a computational complexity of $\Omega(\tau)$, because exactly $\tau$ vertices in the mobility graph must be verified. Because the size of the PLA is $\Omega(\tau^2)$, its verification required $\Omega(\tau^3)$ steps. Thus, constructing the PLA must has a computational complexity of $\Omega(\tau^3)$.

While the invention has been described with respect to a limited number of embodiments, it will be appreciated that many variations, modifications and other applications of the invention may be made.

What is claimed is:

1. In a shared media network including a plurality of users, a method for allocating network resources among the users, comprising the steps of:
   (a) computing at least one load factor $\alpha$; an
   (b) transmitting, to each user, one of said at least one $\alpha$;
   (c) for each user, computing an access threshold, based on said $\alpha$ transmitted to said each user, said computing of said access threshold being effected by said each user;
   (d) for each user, computing an access priority; and
   (e) for each user, accessing the network at a time depending on said access threshold and said access priority.

2. The method of claim 1, wherein said access priority is based on a parameter reflecting user activity.

3. The method of claim 2, wherein said parameter is selected from the group consisting of a distance traversed since a previous access and a time since a previous access.

4. The method of claim 1, further comprising the step of assigning each user a certain base priority.

5. The method of claim 4, wherein said base priority includes a base priority time T.

6. The method of claim 5, wherein said access threshold includes an access threshold time T' based on T and $\alpha$.

7. The method of claim 6, wherein T' is based on a product of T and $\alpha$.

8. The method of claim 6, wherein said access priority includes a time since a previous access, said access being effected when said time since said previous access satisfies a condition selected from the group consisting of equaling T' and exceeding T'.

9. The method of claim 1, further comprising the step of:
   (f) updating said at least one $\alpha$.

10. In a shared media network including a plurality of users moving among a plurality of cells defined by boundaries, a method for tracking the users, comprising the steps of:
   (a) for each cell;
      (i) computing a load factor $\alpha$, and
      (ii) transmitting $\alpha$ to each user located in said each cell;
   (b) for each user, computing a registration threshold, based on $\alpha$, said computing of said registration threshold being effected by said each user;
   (c) for each user, computing a registration priority; and
   (d) for each users registering, with the network, an identity of a cell whereat said each user is located, at a time depending on said registration threshold and said registration priority, said registering thereby constituting a location update for said each user.

11. The method of claim 10, wherein said registration priority is based on a user parameter selected from the group consisting of a distance traversed since a previous location update, a number of boundary crossings performed since a previous location update, and a time since a previous location update.

12. The method of claim 10, further comprising the step of assigning each user a certain base priority.

13. The method of claim 12, wherein said base priority includes a base priority time T.

14. The method of claim 13, wherein said registration threshold includes a registration threshold time T' based on T and $\alpha$.

15. The method of claim 14, wherein T' is based on a product T and $\alpha$.

16. The method of claim 14, wherein said registration priority includes a time since a previous location update, said registering being effected when said time since said previous location update satisfies a condition selected from the group consisting of equaling T' and exceeding T'.

17. The method of claim 10, further comprising the step of:
   (e) for each cell: updating $\alpha$.

18. The method of claim 17, wherein said registering is effected via an up-link control channel, and wherein said updating is effected by replacing $\alpha$ with the product of $\alpha$ and a function of $U_r$, $U_c$, $\rho_d$ and $\rho_{ucc}$, wherein $U_r$ is a bandwidth of said up-link control channel that is used for said registering, $U_c$ is a bandwidth of said up-link control channel used for call requests initiated by the users, $\rho_d$ is a desired utilization of said up-link control channel, and $\rho_{ucc}$ is an actual utilization of said up-link control channel.

19. The method of claim 18, wherein said function is $$\frac{U_r}{\frac{\rho_d}{\rho_{ucc}}(U_r + U_c) - U_c}.$$

20. In a shared media network including a plurality of users, a method for allocating network resources among the users, comprising the steps of:
   (a) computing at least one load factor $\alpha$;
   (b) transmitting, to each user, one of said at least one $\alpha$;
   (c) assigning to each user a base priority that includes a base priority time T;
   (d) for each user, computing an access threshold, based on said $\alpha$ transmitted to said each user, said access threshold including an access threshold time based on T and $\alpha$;
   (e) for each user, computing an access priority; and
   (f) for each user, accessing the network at a time depending on said access threshold and said access priority.

21. In a shared media network including a plurality of users moving among a plurality of cells defined by boundaries, a method for tracking the users, comprising the steps of:

(a) for each cell:
  (i) computing a load factor $\alpha$, and
  (ii) transmitting $\alpha$ to each user located in said each cell;
(b) assigning to each user a base priority that includes a base priority time T;
(c) for each user, computing a registration threshold, based on $\alpha$, said registration threshold including a registration threshold time based on T and $\alpha$;
(d) for each user, computing a registration priority; and
(e) for each user, registering, with the network, an identity of a cell whereat said each user is located, at a time depending on said registration threshold and said registration priority, said registering thereby constituting a location update for said each user.

22. In a shared media network including a plurality of users moving among a plurality of cells defined by boundaries, a method for tracking the users, comprising the steps of:
(a) for each cell;
  (i) computing a load factor $\alpha$, and
  (ii) transmitting $\alpha$ to each user located in said each cell;
(b) for each user, computing a registration threshold, based on $\alpha$;
(c) for each user, computing a registration priority;
(d) for each user, registering, with the network, via an tip-link control channel, an identity of a cell whereat said each user is located, at a time depending on said registration threshold and said registration priority, said registering thereby constituting a location update for said each user; and
(e) updating $\alpha$ by replacing $\alpha$ with the product of $\alpha$ and a function of $U_r$, $U_c$, $\rho_d$ and $\rho_{ucc}$, wherein $U_r$ is a bandwidth of said up-link control channel that is used for said registering, $U_c$ is a bandwidth of said up-link control channel used for call requests initiated by the users, $\rho_d$ is a desired utilization of said up-link control channel, and $\rho_{ucc}$ is an actual utilization of said up-link control channel.

23. In a shared media network including a plurality of users moving among a plurality of cells, a method for paging the users, comprising the steps of:
(a) for each cell, providing a load factor $\alpha$; and
(b) for each user;
  (i) determining a personal location area, based on $\alpha$, by constructing a mobility graph including a plurality of vertices, one of said vertices being an initial vertex and at least one of said vertices being a non-reporting vertex connected to said initial vertex by a feasible roaming path, said personal location area including only cells corresponding to said at least one non-reporting vertex, and
  (ii) paging said each user only in cells located in said personal location area.

24. In a shared media network including a plurality of users moving among a plurality of cells, a method for paging the users, comprising the steps of:
(a) for each cell, providing a load factor $\alpha$; by constructing a mobility graph including a plurality of vertices, one of said vertices being an initial vertex and at least one of said vertices being a non-reporting vertex, said personal location area including only cells corresponding to said at least one non-reporting vertex,
(b) for each user;
  (i) determining a personal location area, based on $\alpha$, and
  (ii) paging said each user only in cells located in said personal location area;
(c) assigning each user a base priority including a base priority time T; and
(d) for each cell corresponding to each of said vertices, computing a registration threshold time T' based on T and $\alpha$, said at least one non-reporting vertex being defined as having a time associated therewith that exceeds a time associated with said initial vertex by less than T'.

25. The method of claim 24, wherein T' is based on a product of T and $\alpha$.

* * * * *